(No Model.)
O. E. LONGWELL.
SPOOL HOLDER.
No. 591,605. Patented Oct. 12, 1897.
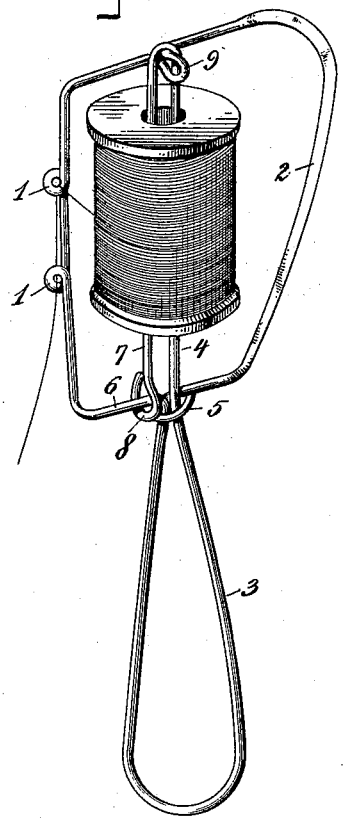
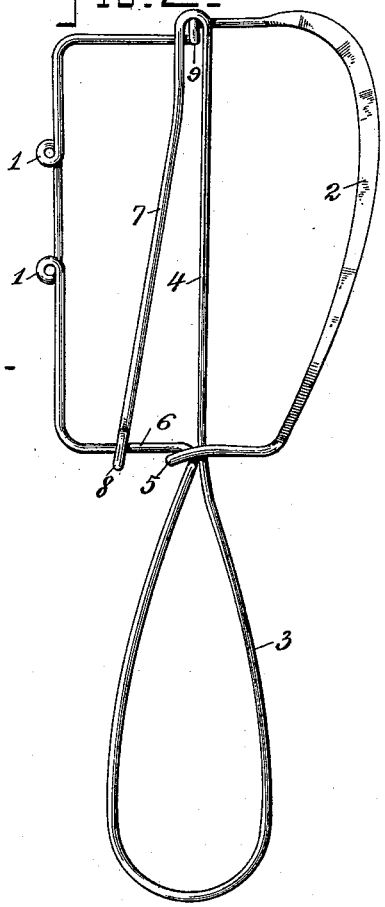
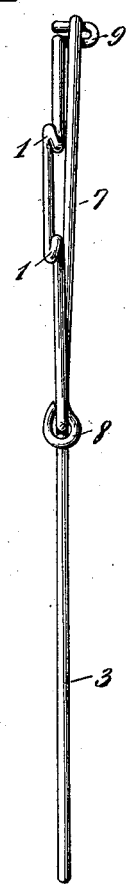
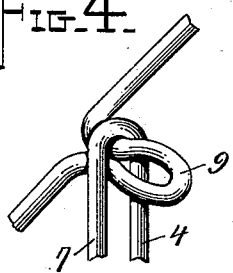
Witnesses
John T. Deuferwil
J. B. Garlinger
Inventor
Orville E. Longwell.
By his Attorneys,
C. A. Snow & Co.

UNITED STATES PATENT OFFICE.

ORVILLE E. LONGWELL, OF HILLSBOROUGH, ILLINOIS.

SPOOL-HOLDER.

SPECIFICATION forming part of Letters Patent No. 591,605, dated October 12, 1897.

Application filed March 31, 1897. Serial No. 630,161. (No model.)

*To all whom it may concern:*

Be it known that I, ORVILLE E. LONGWELL, a citizen of the United States, residing at Hillsborough, in the county of Montgomery and State of Illinois, have invented a new and useful Spool-Thread Holder and Cutter, of which the following is a specification.

This invention relates to certain improvements in spool-thread holders, and has for its object to provide a device of this character of a simple and inexpensive nature which shall be adapted for convenient use not merely for holding a spool of thread, but also for preventing the thread from being unwound from the spool, the device being also provided with means for cutting the thread.

The invention contemplates certain novel features of the construction, combination, and arrangement of the various parts of the improved spool-thread holder whereby certain important advantages are attained and the device is made simpler, cheaper, and otherwise better adapted and more convenient for use, all as will be hereinafter fully set forth.

The novel features of the invention will be carefully defined in the claims.

In order that my improvements may be the better understood, I have shown in the accompanying drawings a spool-thread holder constructed in accordance with my invention, in which—

Figure 1 is a perspective view of the improved device, showing a spool of thread carried thereon; and Fig. 2 is a side view showing the improved holder, the spool being removed therefrom. Fig. 3 is an edge view showing the holder, and Fig. 4 is a fragmentary detail view showing the means for holding the free end of the spindle whereon the spool is carried.

As shown in the drawings, the improved holder is formed of a single piece of wire bent to shape; but it will be obvious that the device may be formed of other material, and for this reason I do not wish to limit myself to the use of wire in constructing the improved holder. The holder is provided with a bent frame having a general rectangular form, one of the side bars of said frame being formed with loops 1 for the passage of the thread and the other side bar thereof being flattened and provided with a cutting edge 2, formed at said flattened portion. The frame is provided at one end with a handle 3, projecting from it, and in order to hold the spool of thread in position in said frame the frame is provided with a spindle 4, extending centrally across it from end to end, on which spindle the spool is adapted to be arranged, as clearly shown in Fig. 1.

In forming the device from a single piece of wire, as shown in the drawings, one end of the wire is formed with a loop 5, which is arranged at the lower end portion of the rectangular frame wherein the spool is carried, and said loop is adapted to embrace the bow-shaped portion bent in the wire and forming the handle 3 of the holder.

The spindle 4 is formed of the opposite extremity of the wire, which extends up from the bow-shaped part of which the handle 3 is formed and through the loop 5, as indicated at 6 in the drawings, and has its end portion bent downwardly at its upper end, as shown at 7, the extreme end of said bent portion 7 being formed with an eye or loop 8, adapted to slide along the lower side of the frame of the device, with which it is loosely engaged.

The downwardly-bent portion 7 of the spindle extends at an angle to the main portion 4 thereof and is adapted to act as a spring-brake to hold the spool when in place on the holder against turning, and in order to hold the upper end of the spindle fast to the frame when the spool is in place thereon, so as to prevent the spool from being dislodged, I provide the upper side of the rectangular frame with a keeper 9 bent in it and extending at right angles from one of its faces, which keeper is adapted to pass through the bend at the upper end of the spindle and frictionally engage the same to hold the spindle fast to the frame at its upper end.

The cutting edge 2 of the holder is made somewhat curved in form, as clearly shown in Fig. 1, and when it is desired to place a spool upon the holder the upper free end of the spindle 4 is disengaged from the keeper 9 at the upper part of the frame and the spool is placed in position on the spindle, after which the keeper 9 is again engaged with the upper end thereof to hold the spool in place. The thread from the spool is then passed through the loops 1 on the side of the frame opposite to the cutting edge 2, and it will be seen that the thread may be conveniently drawn out through said loops from time to time in lengths sufficient for use, the thread being cut off by simply turning the holder in such a way that the cutting edge 2 will be caused to engage the thread.

The cutting edge 2 being arranged at the side of the holder opposite to the loops 1 insures that a sufficient length of the thread will be left projecting beyond the loops 1 to permit the user to catch hold thereof, and said cutting edge 2 being, as shown, of a curved form permits the device to be conveniently used in ripping seams, and in order to better fit the device for this purpose the spool may be conveniently removed when desired.

From the above description it will be seen that the thread-holder is of an extremely simple and inexpensive nature and is especially well adapted for the purposes for which it is designed, and it will be obvious from the above description that the invention is capable of some modification without material departure from its principles and spirit, and for this reason I do not wish to be understood as limiting myself to the precise form and arrangement of the parts herein set forth.

Having thus described my invention, I claim—

1. A spool-thread holder comprising a frame, one of the end bars of which is formed, at an intermediate point of its length, with a keeper, and a side bar provided with a guide-loop, and a spool-spindle extending centrally across the frame, looped at its free end to engage with the keeper, and doubled back upon itself to form the brake-arm which is provided at its free end with a loop, slidably fitted on the end bar opposite to the keeper, as and for the purposes described.

2. A spool-thread holder comprising a frame provided with a keeper, as 9, on one end bar, a handle, and a double spindle continuous with the handle and extending across the frame to have its doubled end engage detachably with the keeper, said spindle being provided at its free end with an eye which slidably fits on the other end bar, whereby said spindle is attached at both ends to the frame to hold the spool against endwise displacement and one member of the spindle is capable of a limited yielding movement to serve as a brake for the spool, substantially as described.

3. A spool-thread holder comprising a frame provided on one of its side bars with a guide eye or loop, a cutter on the other side bar of said frame, a keeper on the top bar, and a spindle extending from the bottom bar across the frame, between its side bars, and engaged detachably with the keeper, substantially as described, for the purposes set forth.

4. A spool-thread holder comprising a substantially rectangular frame, having one of its end bars provided with a laterally-extending keeper, situated at a point intermediate of the length of said bar, and a spindle extending from the opposite end bar, across the frame, and bent upon itself to form a looped end to engage with the keeper, and to form a spring-brake 7, the free end of which is looped to engage the end bar from which the spindle projects, as and for the purposes described.

5. A spool-thread holder bent from a single piece of wire to form a frame, a handle extending beyond one of the bars of said frame, and a spindle extending across the frame substantially in alinement with the handle, the part of the wire that forms the handle and spindle being doubled back upon itself to provide a spring-brake, as and for the purposes described.

6. A spool-thread holder bent from a single piece of wire to form a frame, a handle extending beyond said frame, and a spindle extending across the frame, that part of the wire forming the handle and spindle being doubled upon itself and slidably attached to the frame to form a spring-brake, and the other end of the wire having a loop to embrace the handle substantially at the point where the latter joins the frame, as and for the purposes described.

In testimony that I claim the foregoing as my own I have hereto affixed my signature in the presence of two witnesses.

ORVILLE E. LONGWELL.

Witnesses:
C. W. GRASSEL,
T. J. McDAVID.